(12) United States Patent
Miyabara

(10) Patent No.: US 9,407,127 B2
(45) Date of Patent: Aug. 2, 2016

(54) BRUSHLESS MOTOR INSULATOR, BRUSHLESS MOTOR STATOR, BRUSHLESS MOTOR, AND METHOD OF MANUFACTURING BRUSHLESS MOTOR

(71) Applicant: SANYO DENKI CO., LTD., Tokyo (JP)

(72) Inventor: Yoshinori Miyabara, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 409 days.

(21) Appl. No.: 14/052,899

(22) Filed: Oct. 14, 2013

(65) Prior Publication Data

US 2014/0103759 A1    Apr. 17, 2014

(30) Foreign Application Priority Data

Oct. 15, 2012  (JP) ................... 2012-227621

(51) Int. Cl.
| | | |
|---|---|---|
| H02K 3/52 | (2006.01) | |
| H02K 11/00 | (2016.01) | |
| H02K 15/00 | (2006.01) | |

(52) U.S. Cl.
CPC ............. *H02K 11/00* (2013.01); *H02K 3/522* (2013.01); *H02K 15/0068* (2013.01); *Y10T 29/49009* (2015.01)

(58) Field of Classification Search
CPC ............ H02K 3/30; H02K 3/32; H02K 3/38; H02K 3/46; H02K 3/50; H02K 3/522; H02K 11/00
USPC .................................... 310/71, 194
See application file for complete search history.

(56) References Cited

U.S. PATENT DOCUMENTS

| | | | | |
|---|---|---|---|---|
| 4,818,911 | A * | 4/1989 | Taguchi ................. | H02K 1/148 310/194 |
| 5,519,271 | A * | 5/1996 | Sakashita ................. | H02K 3/50 310/216.005 |
| 7,138,741 | B2 * | 11/2006 | Lee ......................... | H02K 3/522 310/194 |
| 7,663,285 | B2 * | 2/2010 | Yumoto ................. | H02K 3/522 310/194 |
| 2004/0256936 | A1 | 12/2004 | Takahashi et al. | |
| 2006/0071569 | A1 * | 4/2006 | Stewart .................. | H02K 1/148 310/194 |
| 2006/0091739 | A1 * | 5/2006 | Hilton ...................... | H02K 1/04 310/45 |

FOREIGN PATENT DOCUMENTS

| | | |
|---|---|---|
| JP | 05-308742 | 4/1992 |
| JP | H08-149734 A | 6/1996 |
| JP | 2004-336897 A | 11/2004 |
| JP | 2006020429 A | 1/2006 |

OTHER PUBLICATIONS

Japanese Office Action mailed on Jan. 26, 2016 for the corresponding Japanese Patent Application No. 2012-227621.

* cited by examiner

*Primary Examiner* — Tran Nguyen
(74) *Attorney, Agent, or Firm* — Polsinelli PC

(57) ABSTRACT

Provided is a brushless motor insulator capable of improving workability relating to the winding of electric wires by a simple configuration. An insulator 10 includes a main body portion 11 and a mooring portion 12. The main body portion 11 includes plural wiring portions 11*b* radially provided so that electric wires 30 are held while being wound on the wiring portions 11*b*. The mooring portion 12 is disposed in the inner periphery or the outer periphery of the main body portion 11 and moors ends of winding start portions or winding end portions of the electric wires 30 of the wiring portions 11*b*.

9 Claims, 7 Drawing Sheets

BRUSHLESS MOTOR INSULATOR, BRUSHLESS MOTOR STATOR, BRUSHLESS MOTOR, AND METHOD OF MANUFACTURING BRUSHLESS MOTOR

CROSS-REFERENCE TO RELATED APPLICATION

This application claims priority to Japanese Application No. 2012-227621, filed Oct. 15, 2012, the entirety of which is incorporated herein by reference.

BACKGROUND

1. Technical Field

The present invention relates to a brushless motor insulator, a brushless motor stator, a brushless motor, and a method of manufacturing the brushless motor.

2. Description of Related Arts

Hitherto, for example, in a brushless motor, a stator has been used in which electric wires respectively wound on plural wiring portions are respectively wired to a wiring board and a predetermined current is applied to the electric wires so as to rotate a rotor inserted into the stator.

Incidentally, since the electric wires are easily bent due to the thin thickness thereof and are densely provided, the workability is poor. Further, the electric wires may be wired to the wiring board while the wiring start portions and the wiring end portions of the electric wires intersect one another at one wiring portion or the electric wires intersect one another between the adjacent wiring portions. In such a case, even when a predetermined current is applied to the electric wires, the rotor does not appropriately rotate.

Here, there is known a configuration in which two drawn wires of a stator winding wire wound on each magnetic pole portion are stretched in the axial direction of a stator core, the drawn wires pass through through-holes formed in a conductive pattern of an insulation substrate, and the drawn wires are wired by soldering (for example, see JP 5-308742 A).

Further, there is known a coil terminal processing substrate that performs a wiring process by fixing a coil end of a coil constituting a stator of a motor to a circular substrate, wherein a protrusion is provided so as to position the coil end to the outer peripheral portion of the substrate, and a U-shaped slit is provided at a front end of the protrusion (for example, see JP 2006-20429 A).

SUMMARY

However, in JP 5-308742 A, there is a concern that some effort and time are spent for handling the winding wires. Meanwhile, in JP 2006-20429 A, there is a concern that the terminals of the coils may be easily separated from the slits of the substrate.

The invention is made in view of the above-described circumstances, and it is a purpose of the invention to provide a brushless motor insulator capable of improving workability relating to the winding of electric wires by a simple configuration. Further, it is a purpose of the invention to provide a stator with a brushless motor insulator. Furthermore, it is a purpose of the invention to provide a brushless motor with a brushless motor insulator and a method of manufacturing the brushless motor.

In order to achieve the above-described object, a brushless motor insulator includes a main body portion and a mooring portion. The main body portion includes plural wiring portions which are radially provided so that electric wires are held while being wound on the wiring portions. A mooring portion is disposed in the inner periphery or the outer periphery of the main body portion and moors ends of winding start portions or winding end portions of the electric wires of the wiring portions.

In order to achieve the above-described object, a brushless motor stator includes an insulator and a stator stack. The insulator includes: a main body portion which is provided with plural wiring portions radially provided so that electric wires are held while being wound on the wiring portions; and a mooring portion which is disposed in the inner periphery or the outer periphery of the main body portion and moors ends of winding start portions or winding end portions of the electric wires of the wiring portions. A stator stack is connected to the insulator and supports a rotor inserted into the insulator while externally or internally contacting the rotor.

In order to achieve the above-described object, a brushless motor includes an insulator, a stator stack, an electric wire, a wiring board, and a rotor. The insulator includes a main body portion which includes plural wiring portions radially provided and a mooring portion which is disposed in the inner periphery or the outer periphery of the main body portion and moors ends of winding start portions or winding end portions of electric wires of the wiring portions. The stator stack is connected to the insulator and supports the rotor inserted into the insulator while externally or internally contacting the rotor. The electric wires are respectively wound on the wiring portions of the insulator. The electric wires are wired to the wiring board. The rotor is inserted into the main body portion of the insulator in a rotatable manner.

In order to achieve the above-described object, a method of manufacturing a brushless motor includes: temporarily mooring ends of winding start portions or winding end portions of electric wires wound on wiring portions so that the ends of the winding start portions or the winding end portions are radially disposed so as to face the radial direction by the mooring portion disposed in the inner periphery or the outer periphery of a main body portion provided with the plurality of wiring portions used to wind the electric wires on the wiring portions; and separating the ends of the winding start portions or the winding end portions of the electric wires from the mooring portion and wiring the electric wires to the wiring board.

According to the brushless motor insulator of the invention, it is possible to improve the workability relating to the winding of the electric wires by providing the mooring portion that moors the ends of the winding start portions or the winding end portions of the electric wires wound on the wiring portions.

DETAILED DESCRIPTION

Figure 1:
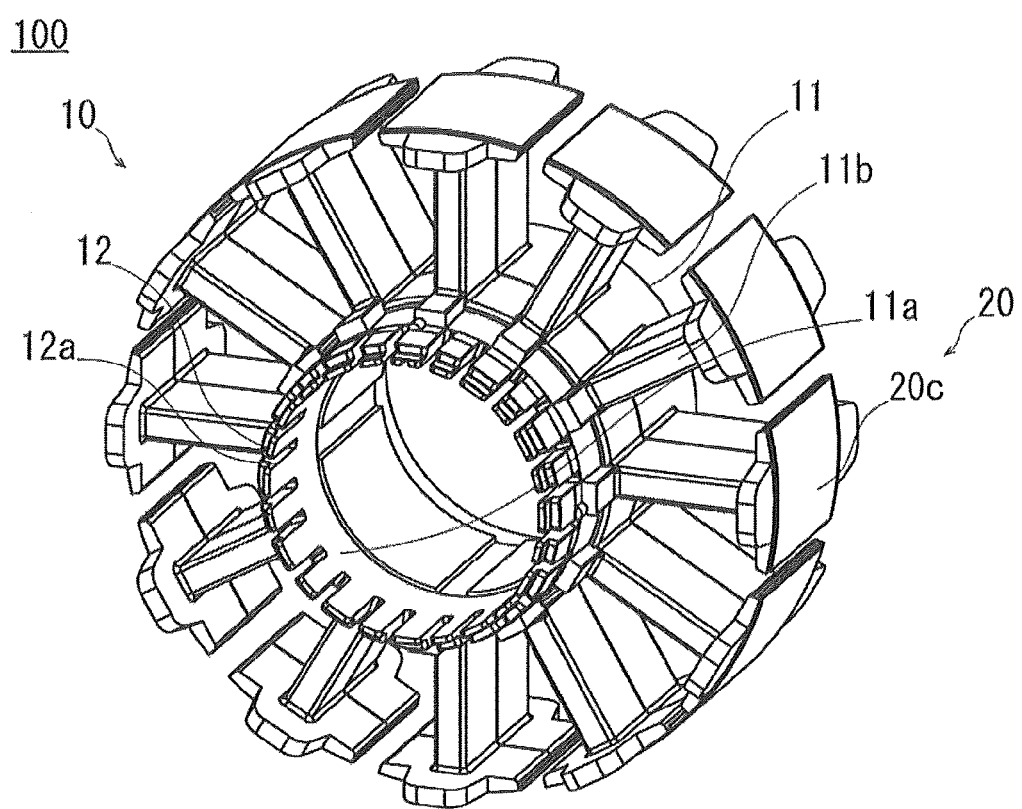
FIG. 1 is a perspective view illustrating a stator according to an embodiment.

Hereinafter, exemplary embodiments of the invention will be described by referring to the accompanying drawings.

Further, the same reference numerals will be given to the same components in the description of the drawings, and the description thereof will not be repeated. Furthermore, in the drawings, the size or magnification of each component may be exaggerated for the convenience of description, and hence may be different from the actual size or magnification.

First Embodiment

An insulator 10 according to a first embodiment will be described by referring to FIGS. 1 to 6.

Figure 2:
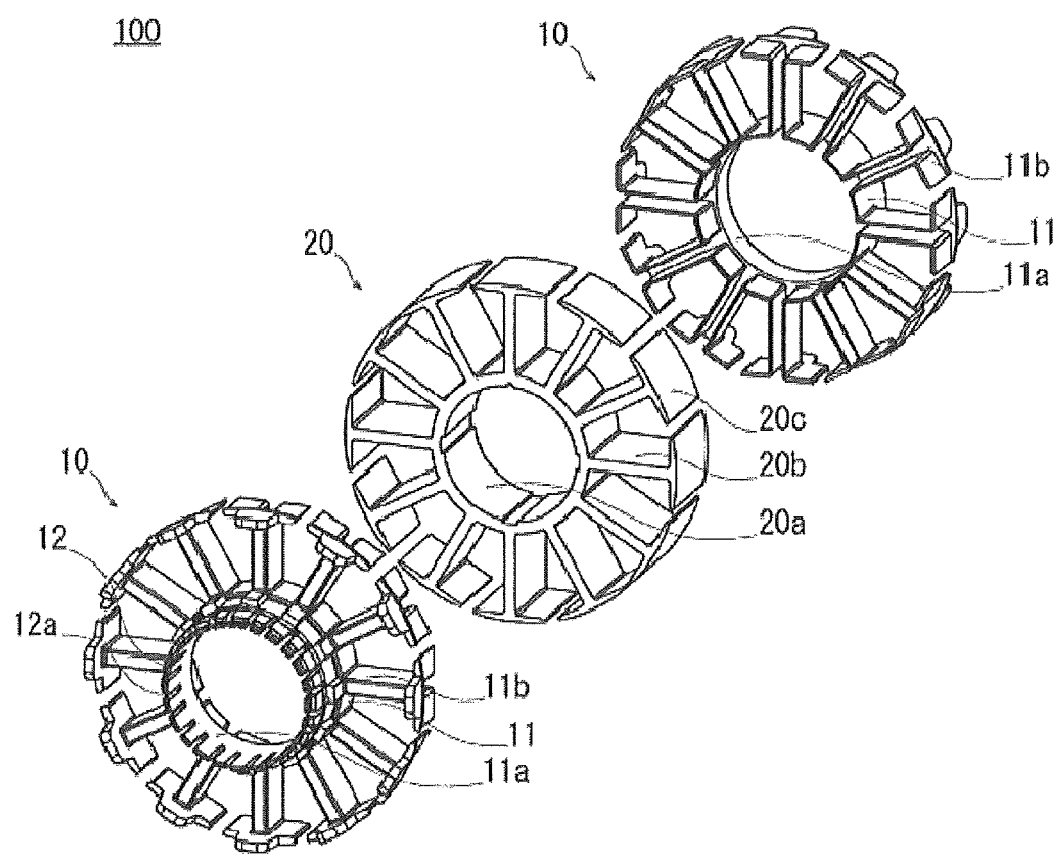
FIG. 2 is an exploded perspective view illustrating the stator according to the embodiment.
Figure 3:
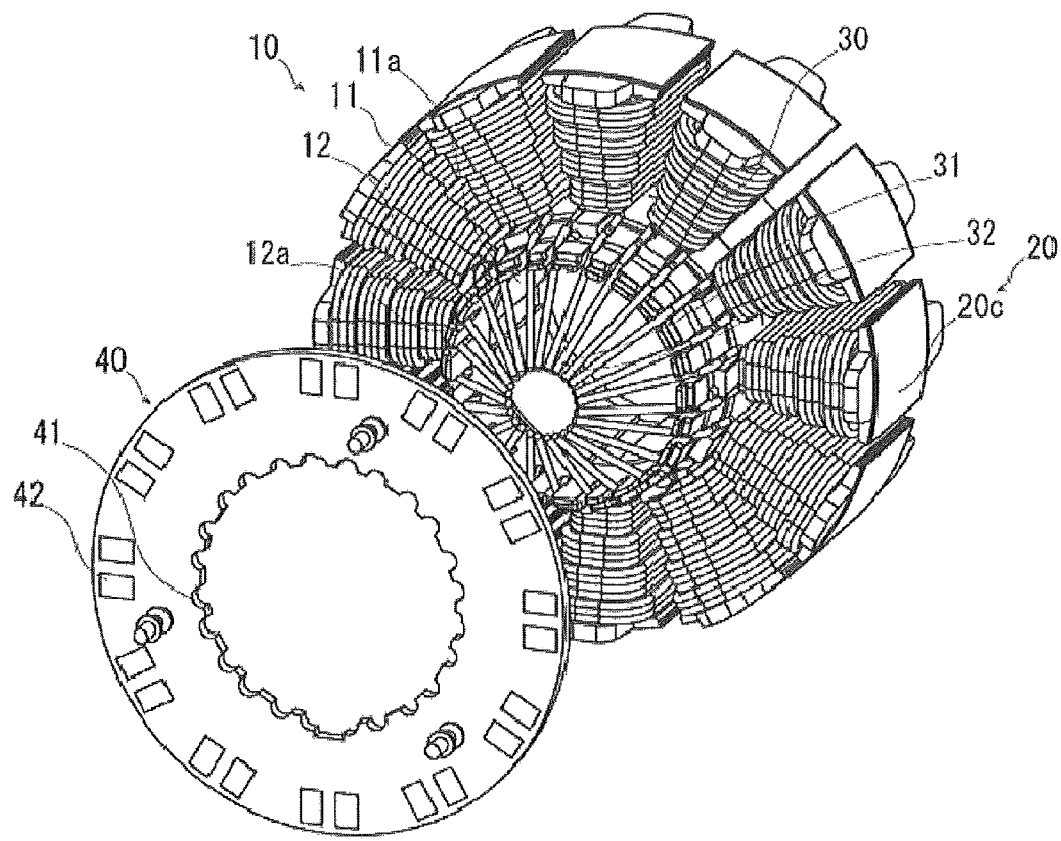
FIG. 3 is a perspective view illustrating an insulator to be attached with a wiring board after electric wires are wound on plural wiring portions according to the embodiment.
Figure 4:
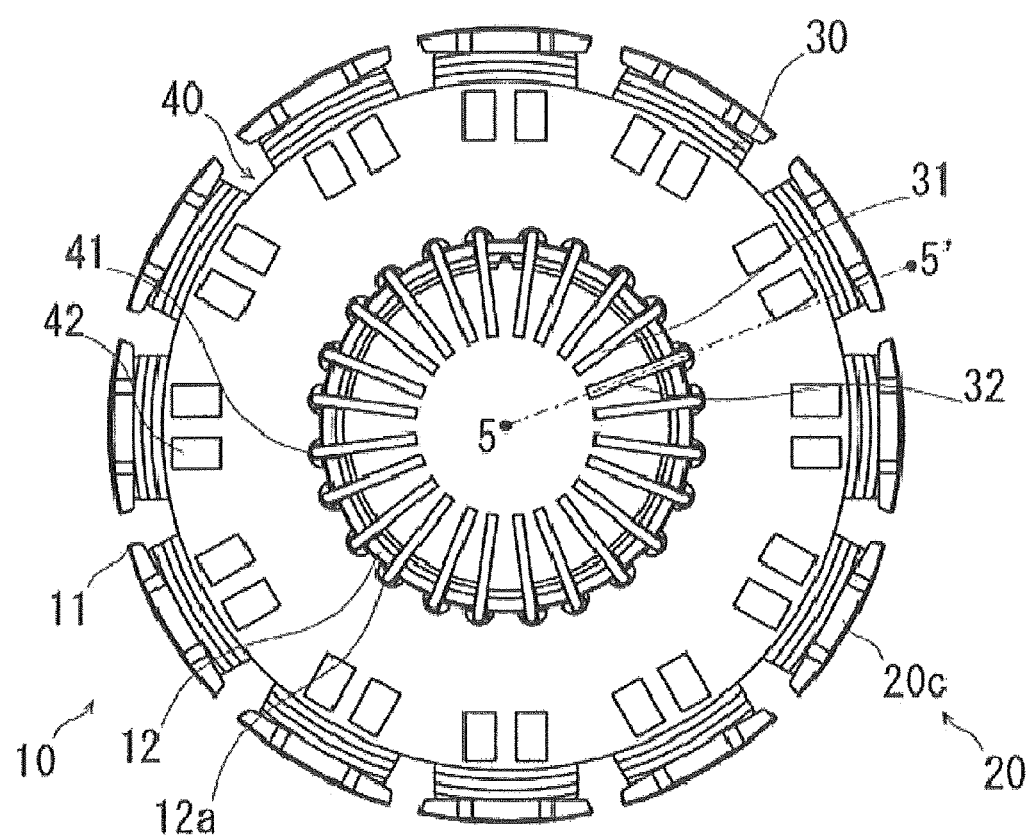
FIG. 4 is a front view of FIG. 3.
Figure 5:
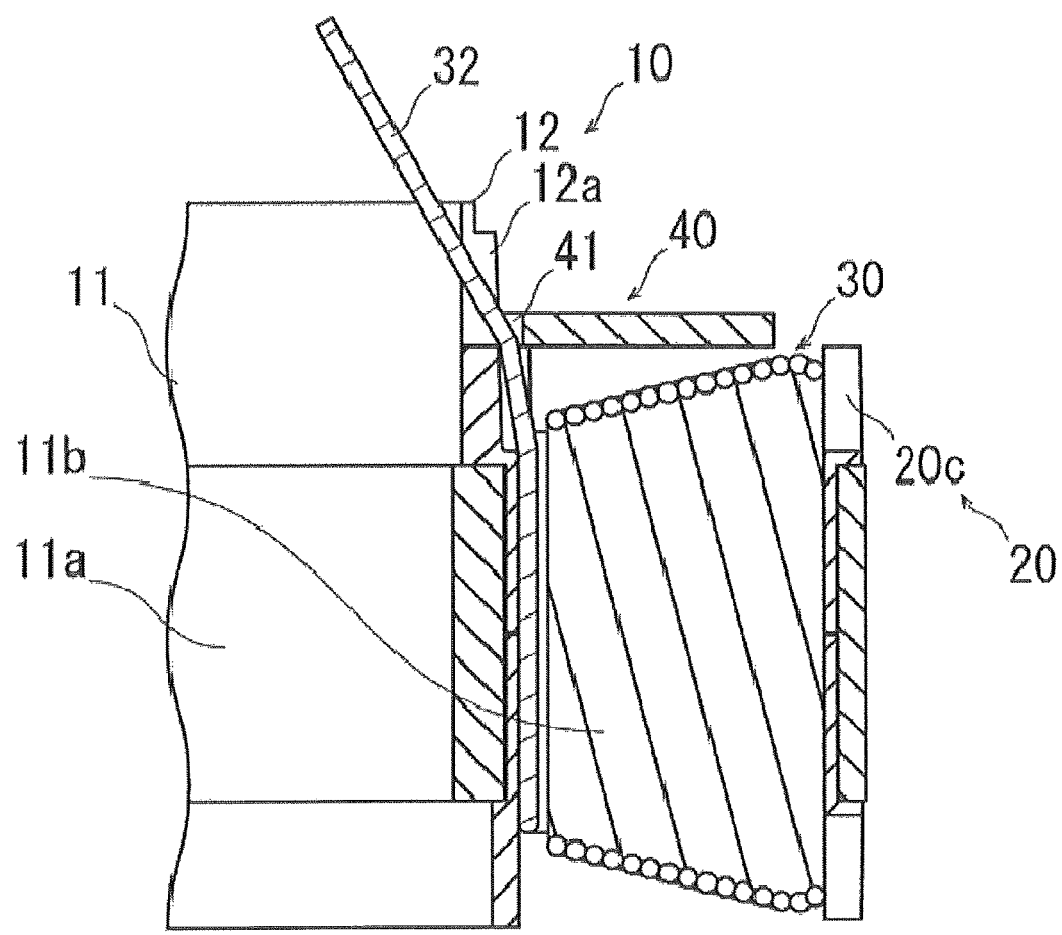
FIG. 5 is a cross-sectional view taken along the line 5-5' of FIG. 4.
Figure 6:
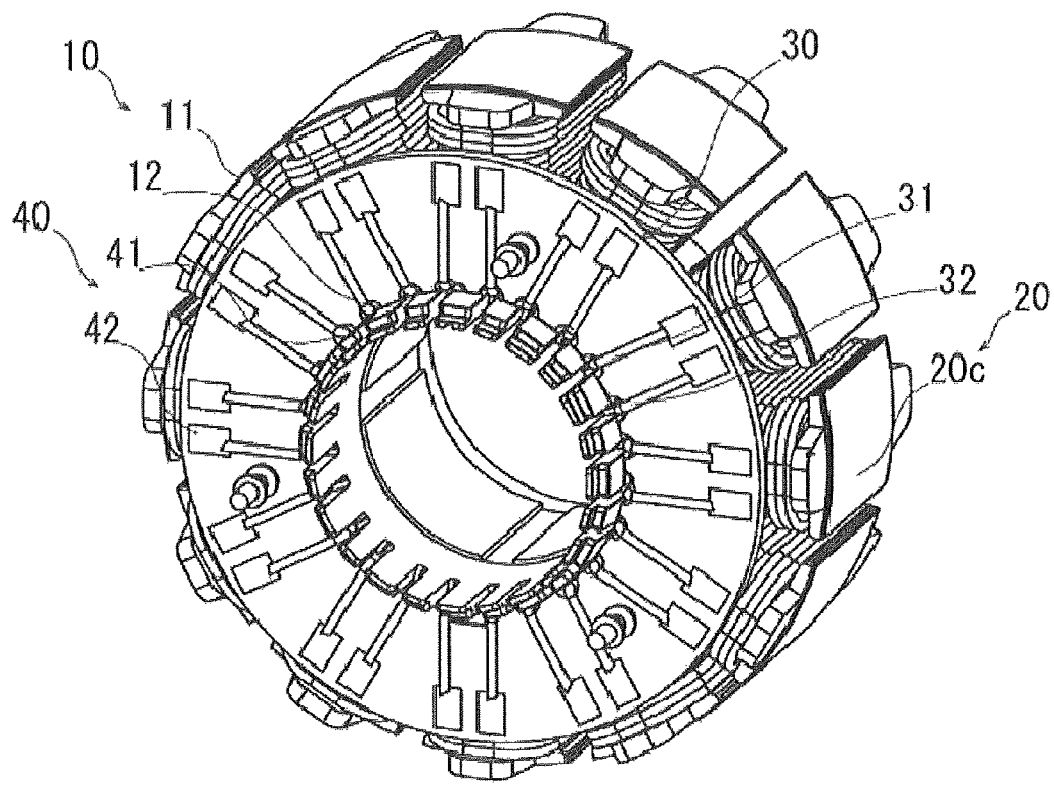
FIG. 6 is a perspective view illustrating an insulator attached with the wiring board of FIG. 3.

FIG. 1 is a perspective view illustrating a stator 100 including the insulator 10. FIG. 2 is an exploded perspective view illustrating the stator 100 including the insulator 10. FIG. 3 is a perspective view illustrating the insulator 10 to be attached with a wiring board 40 after electric wires 30 are wound on plural wiring portions 11b. FIG. 4 is a front view of FIG. 3. FIG. 5 is a cross-sectional view taken along the line 5-5' of FIG. 4. FIG. 6 is a perspective view illustrating the insulator 10 attached with the wiring board 40 of FIG. 3.

As illustrated in FIGS. 3 to 6, the insulator 10 uses the respective electric wires 30, respectively wound on plural wiring portions 11b, in a manner such that the electric wires 30 are wired to the wiring board 40. The insulator 10 includes a main body portion 11 and a mooring portion 12. In a second embodiment to be described later, as illustrated in FIG. 2, the pair of insulators 10 sandwiches both ends of a stator stack 20 so as to cover the stator stack 20.

As illustrated in FIG. 1, the main body portion 11 is provided with plural wiring portions 11b which are radially provided so that the electric wires 30 are held while being wound on the wiring portions 11b. Specifically, the main body portion 11 is provided with a cylindrical portion 11a which is formed as, for example, an insulating body and is formed in a cylindrical shape. Twelve wiring portions 11b which are formed as, for example, an insulating body and are formed as an elongated body shape are radially provided at the same interval on the outer peripheral surface of the cylindrical portion 11a. The wiring portions 11b correspond to slots. The wiring portions 11b are integrally molded with the cylindrical portion 11a. Furthermore, the number of the wiring portions 11b is not limited to twelve, and may be, for example, six, nine, fifteen, or eighteen and the like as the number of the integral multiple of three. The electric wires 30 are wound on the respective winding portions 11b.

The mooring portion 12 is disposed on the inner periphery or the outer periphery of the main body portion 11 and moors the end of the winding start portion or the winding end portion of the electric wire 30 of the wiring portion 11b. Specifically, the mooring portion 12 is formed so as to protrude from, for example, one side of the axial direction of the cylindrical portion 11a of the main body portion 11. The mooring portion 12 is provided with twelve pairs of notch portions 12a which correspond to the twelve wiring portions 11b provided in the main body portion 11. The notch portions 12a correspond to the positioning grooves of the electric wires 30. Each groove may be formed in a V-shape of which the width is gradually narrowed or a shape with a uniform width. Since each electric wire 30 is provided with one end 31 of the winding start portion and the other end 32 of the winding end portion, each pair of electric wire is provided with two notch portions 12a. That is, the mooring portion 12 is provided with twenty four notch portions 12a in total.

As illustrated in FIGS. 3 to 5, the mooring portion 12 temporarily moors the end of the electric wire 30 bent toward the center side of the main body portion 11. As illustrated in FIG. 6, when the electric wires 30 are wired to the wiring board 40, the moored ends of the electric wires 30 bent toward the outside of the main body portion 11 in the radial direction are disengaged. According to the insulator 10 with such a configuration, the ends of the electric wires 30 are temporarily moored to the mooring portion 12 provided in the main body portion 11, and the electric wires 30 are wired to the wiring board 40.

Accordingly, it is possible to prevent the poor wired state of the electric wires 30 of the wiring board 40 by using the insulator 10. That is, it is possible to prevent the electric wires 30 from being wired to the wiring board 40 in a state where one end 31 of the winding start portion of the electric wire 30 intersects the other end 32 of the winding end portion in one wiring portion 11b, or a state where the electric wires 30 intersect each other between the adjacent wiring portions 11b.

Furthermore, the invention is not limited to the configuration in which the mooring portion 12 moors both ends (one end 31 of the winding start portion and the other end 32 of the winding end portion) of the electric wire 30. For example, a configuration may be employed in which one end 31 or the other end 32 is moored. Similarly, the invention is not limited to the configuration in which the mooring portion 12 moors all ends of twelve pairs of electric wires 30, and a configuration may be employed in which the ends of six pairs of electric wires 30 are moored instead of the ends of one pair of electric wires 30.

According to the insulator 10 of the above-described first embodiment, the following operation and effect may be obtained.

The insulator 10 includes the main body portion 11 and the mooring portion 12. The main body portion 11 is provided with plural wiring portions 11b which are radially provided so that the electric wires 30 are held while being wound on the wiring portions 11b. The mooring portion 12 is disposed in the inner periphery or the outer periphery of the main body portion 11, and moors the ends of the winding start portions or the winding end portions of the electric wires 30 of the wiring portions 11b.

According to the insulator 10 with such a configuration, it is possible to improve the workability relating to the winding of the electric wire 30 by providing the mooring portion 12 that moors the ends of the winding start portions or the winding end portions of the electric wires 30 wound on the wiring portions 11b.

According to the insulator 10 with such a configuration, it is possible to sufficiently prevent the poor wired state of the electric wires 30 of the wiring board 40.

According to the insulator 10 with such a configuration, it is possible to resolve the bending of the electric wires 30 by pulling the electric wires 30 when the mooring portion 12 moors the ends of the electric wires 30 respectively wound on plural wiring portions 11b. Thus, it is possible to prevent the contact between the terminals of the electric wires 30 and the like.

According to the insulator 10, the mooring portion 12 may individually moor each of both ends (one end 31 and the other end 32) of the winding start portion and the winding end portion of the electric wire 30 wound on the wiring portion 11b.

According to the insulator 10 with such a configuration, it is possible to further reliably prevent the poor wired state of the electric wire 30 compared to the case where either the mooring portion 12 moors one end 31 or the other end 32 of the ends of the electric wires 30 wound on plural wiring portions 11b.

Further, the mooring portion 12 may clamp the electric wire 30 by the notch portions 12a formed in the mooring portion 12.

According to the insulator 10 with such a configuration, the workability is improved by a simple configuration in which the mooring portion 12 is provided with the notch portions 12a, and hence the ends of the electric wire 30 may be sufficiently clamped. Further, plural electric wires 30 having different diameters may be also handled.

Modified Example of First Embodiment

An insulator 50 according to a modified example of the first embodiment will be described by referring to FIG. 7.

Figure 7:
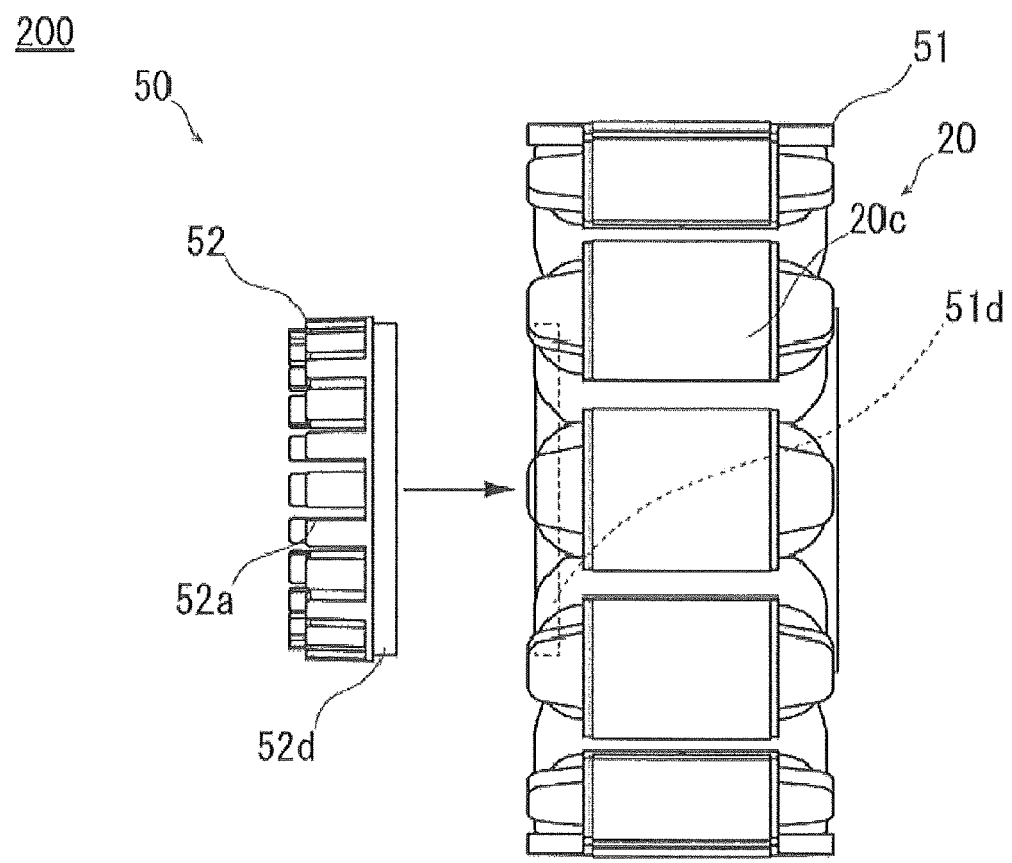
FIG. 7 is a side view illustrating a stator according to a modified example of a first embodiment.

FIG. 7 is a side view illustrating a stator 200 including the insulator 50.

The insulator 50 is different from the insulator 10 according to the above-described first embodiment in that a mooring portion 52 is attachable to or detachable from a main body portion 51.

In the modified example of the first embodiment, the same reference numerals will be used for the same components as those of the first embodiment, and the description thereof will not be repeated.

The insulator 50 includes the main body portion 51 and the mooring portion 52. The main body portion 51 is formed of the same material as that of the main body portion 11 of the insulator 10 so as to have the same shape, but one axial surface thereof is provided with a connection concave portion 51d formed as a hole with a predetermined depth. A connection convex portion 52d of the mooring portion 52 to be described later is inserted into the connection concave portion 51d. The mooring portion 52 is formed of the same material as that of the mooring portion 12 of the insulator 10 so as to have the same shape, but the surface facing the main body portion 51 is provided with the connection convex portion 52d formed as a protrusion. When inserting the connection convex portion 52d of the mooring portion 52 into the connection concave portion 51d of the main body portion 51, both portions may be bonded to each other by an adhesive or may be simply combined with one another. According to the insulator 50 with such a configuration, for example, the case of separately molding the mooring portion 52 and the main body portion 51 is suitable for the case where both portions are easily manufactured and the manufacturing cost thereof is suppressed.

According to the insulator 50 of the above-described modified example of the first embodiment, the following operation and effect may be obtained.

The insulator 50 is formed so that the mooring portion 52 is attachable to or separable from the main body portion 51.

According to the insulator 50 with such a configuration, for example, the case of separately molding the mooring portion 52 and the main body portion 51 is suitable for the case where both portions are easily manufactured and the manufacturing cost thereof is suppressed.

Second Embodiment

The stator 100 according to a second embodiment will be described by referring to FIG. 2.

The stator 100 includes the insulator 10 or 50 according to the above-described first embodiment.

In the second embodiment the same reference numerals will be used for the same components as those of the first embodiment, and the description above will not be repeated.

As illustrated in FIG. 2, the stator 200 includes the insulator 10 or 50 and the stator stack 20. The stator stack 20 is connected to the insulator 10 or 50, and supports the rotor inserted into the insulator 10 or 50 while externally or internally contacting the rotor. In the second embodiment, the stator stack 20 supports the rotor inserted into the insulator 10 while an outer peripheral portion 20c externally contacts the inner peripheral surface of the rotor.

As illustrated in FIG. 2, the stator stack 20 is sandwiched between both ends of the pair of insulators 10. A cylindrical portion 20a is provided at the center of the stator stack 20. The cylindrical portion 20a is formed of, for example, a silicon steel plate so as to have a cylindrical shape. Wiring portions 20b correspond to slots. The wiring portions 20b protrude outward from the cylindrical portion 20a so as to be integrally molded with the cylindrical portion 20a. An outer peripheral portion 20c which is provided at the front end of each wiring portion 20b is formed in a curved plate shape which protrudes outward so that the outer peripheral portion approaches an inner peripheral surface of a rotor (not illustrated). The cylindrical portion 20a and the wiring portion 20b of the stator stack 20 are partially covered by the cylindrical portion 11a and the wiring portion 11b of the insulator 10.

According to the stator 100 of the above-described second embodiment, the following operation and effect may be obtained.

According to the stator 100 with such a configuration, since the stator stack 20 is sandwiched between both ends of the pair of insulators 10 and the electric wires 30 respectively wound on plural wiring portions 11b are respectively wired to the wiring board 40 through the mooring portion 12 correctly, it is possible to prevent any problem in characteristic such as loss of synchronism caused by the poor wired state of the electric wires 30.

Third Embodiment

A brushless motor and a method of manufacturing the brushless motor according to the third embodiment will be described.

The brushless motor is equipped with the insulator 10 or 50 of the above-described first embodiment.

In the third embodiment, the same reference numerals will be used for the same components as those of the first embodiment, and the description thereof will not be repeated.

The brushless motor includes the insulator 10 or 50, the stator stack 20, the electric wire 30, the wiring board 40, and the rotor. The electric wires 30 are respectively wound on plural wiring portions 11b or 51a of the insulator 10 or 50. The wiring board 40 is formed as, for example, a glass epoxy substrate, and is formed in a disk shape having an opening formed therein. Twenty four notch portions 41 in total are formed along the inner peripheral surface of the opening of the wiring board 40 so as to respectively correspond to one ends 31 and the other ends 32 of the respective electric wires 30. Twenty four soldering portions 42 in total are formed in the vicinity of the outer periphery of the wiring board 40 so as to correspond to one ends 31 and the other ends 32 of the respective electric wires 30. The wiring board 40 is connected to one ends 31 and the other ends 32 of the electric wires 30 so as not to cause short-circuiting.

The rotor is formed as a permanent magnet of which N and S poles are adjacent to each other, and is formed in a cylindrical shape. The rotor passes through the main body portion 11 or 51 of the insulator 10 or 50 in a rotatable manner. Here, in the insulator 10 or 50, the ends of the electric wires 30 are moored by the mooring portion 12 or 52 formed in the main body portion 11 or 51 provided with plural wiring portions 11b. When a predetermined driving current is applied to the electric wires 30, the rotor passing through the insulator 10 or 50 rotates.

Here, a method of manufacturing the brushless motor includes: temporarily mooring the ends of the winding start portions or the winding end portions of the electric wires 30 wound on the wiring portions 11b so that the ends of the winding start portions or the winding end portions are radially disposed so as to face the radial direction by the mooring portion 12 disposed in the inner periphery or the outer periphery of the main body portion 11 provided with plural wiring portions 11b used to wind the electric wires 30 on the wiring portions 11b; and separating the ends of the winding start portions or the winding end portions of the electric wires 30 from the mooring portion 12 and wiring the electric wires 30 to the wiring board 40.

According to the brushless motor and the method of manufacturing the brushes motor of the above-described third embodiment, the following operation and effect may be obtained.

According to the brushless motor with such a configuration, it is possible to prevent any problem in characteristic such as poor rotation caused by the poor wired state of the electric wires 30 by the insulator 10 or 50 in which the electric wires 30 respectively wound on plural wiring portions 11b are correctly wired to the wiring board 40.

While the preferred embodiments of the invention have been described, these embodiments are merely examples for the description of the invention, and the scope of the invention is not limited to these embodiments. That is, the invention may be implemented as various embodiments different from the first to third embodiments without departing from the spirit of the invention.

For example, as the insulator according to the modified example of the first embodiment, a configuration may be employed in which the mooring portion is attached to the main body portion, the electric wires 30 are wired to the wiring board 40, and the mooring portion is separated from the main body portion. That is, the mooring portion may be separated from the main body portion in order to decrease the size of the device or prevent the interference with the other components after the electric wires 30 are wired to the wiring board 40.

The insulators 10 and 50 have been described as the configuration of the stator that rotates the rotor inserted into the outer peripheral surface thereof. However, the invention is not limited to such a configuration. For example, a stator may be used which rotates the rotor inserted into the inner peripheral surface thereof. The insulators 10 and 50 are not limited to the configuration as the stator, and may be configured as the rotor.

What is claimed is:

1. A brushless motor insulator comprising:
a main body portion which includes a plurality of wiring portions radially provided so that electric wires are held while being wound on the wiring portions; and
a mooring portion which is disposed in an inner periphery or an outer periphery of the main body portion and moors ends of winding start portions or winding end portions of the electric wires of the wiring portions;
wherein the mooring portion individually moors both ends of the winding start portions and the winding end portions of the electric wires wound on the wiring portions;
wherein the mooring portion moors the electric wires by a plurality of radial notch portions that extend completely through the mooring portion, with a discrete pair of the notch portions provided for each wire; and
wherein each of the ends of the each wire passes through the corresponding one of the discrete pair of the radial notch portions.

2. The brushless motor insulator according to claim 1, wherein the mooring portion individually moors both ends of the winding start portions and the winding end portions of the electric wires wound on the wiring portions.

3. The brushless motor insulator according to claim 1, wherein the mooring portion clamps the electric wires by a notch portion formed in the mooring portion.

4. The brushless motor insulator according to claim 1, wherein the mooring portion is attachable to or detachable from the main body portion.

5. A brushless motor stator comprising:
an insulator which includes a main body portion including a plurality of wiring portions radially provided so that electric wires are held while being wound on the wiring portions and a mooring portion disposed in the inner periphery or the outer periphery of the main body portion and mooring individual ends of winding start portions and winding end portions of the electric wires of the wiring portions; and
a stator stack which is connected to the insulator and supports a rotor inserted into the insulator while externally or internally contacting the rotor;
wherein the mooring portion individually moors both ends of the winding start portions and the winding end portions of the electric wires wound on the wiring portions;
wherein the mooring portion moors the electric wires by a plurality of radial notch portions that extend completely through the mooring portion, with a discrete pair of the notch portions provided for each wire.

6. A brushless motor comprising:
an insulator which includes a main body portion including a plurality of wiring portions radially provided and a mooring portion disposed in the inner periphery or the outer periphery of the main body portion and mooring individual ends of winding start portions and winding end portions of the electric wires of the wiring portions;
a stator stack which is connected to the insulator and supports a rotor inserted into the insulator while externally or internally contacting the rotor;
the electric wires which are respectively wound on the wiring portions of the insulator;
a wiring board to which the electric wires are wired; and
a rotor which is inserted into the main body portion of the insulator in a rotatable manner;
wherein the mooring portion individually moors both ends of the winding start portions and the winding end portions of the electric wires wound on the wiring portions;
wherein the mooring portion moors the electric wires by a plurality of radial notch portions that extend completely through the mooring portion, with a discrete pair of the notch portions provided for each wire.

7. A method of manufacturing a brushless motor comprising:
temporarily mooring ends of winding start portions or winding end portions of electric wires wound on wiring portions so that the ends of the winding start portions and the winding end portions are radially disposed so as to face the radial direction by a mooring portion disposed in the inner periphery or the outer periphery of a main body portion provided with the plurality of wiring portions used to wind the electric wires on the wiring portions; and
separating the ends of the winding start portions or the winding end portions of the electric wires that are temporarily moored from the mooring portion and wiring the electric wires to the wiring board;

wherein the mooring portion individually moors both ends of the winding start portions and the winding end portions of the electric wires wound on the wiring portions;

wherein the mooring portion moors the electric wires by a plurality of radial notch portions that extend completely through the mooring portion, with a discrete pair of the notch portions provided for each wire.

8. The brushless motor insulator according to claim 1, wherein each of the ends of the each wire passes through the corresponding one of the discrete pair of the radial notch portions to form a non-zero angle with radial and axial axes of the motor insulator.

9. The brushless motor insulator according to claim 6, wherein the winding start portions and the wining end portions of the electric wires are wired to the wiring board in a and separated from the mooring portion.

* * * * *